United States Patent
Rivas et al.

(10) Patent No.: US 12,453,944 B2
(45) Date of Patent: Oct. 28, 2025

(54) DEVICE FOR DISPERSING WATER-SOLUBLE POLYMERS

(71) Applicant: SNF Group, Andrezieux Boutheon (FR)

(72) Inventors: Christophe Rivas, Andrezieux Boutheon (FR); Julien Bonnier, Andrezieux Boutheon (FR)

(73) Assignee: SNF Group (FR)

( * ) Notice: Subject to any disclaimer, the term of this patent is extended or adjusted under 35 U.S.C. 154(b) by 563 days.

(21) Appl. No.: 17/991,281

(22) Filed: Nov. 21, 2022

(65) Prior Publication Data

US 2023/0166222 A1  Jun. 1, 2023

(30) Foreign Application Priority Data

Nov. 29, 2021 (FR) ...................................... 2112673

(51) Int. Cl.
| | | |
|---|---|---|
| *B01F 23/00* | (2022.01) | |
| *B01F 21/10* | (2022.01) | |
| *B01F 23/50* | (2022.01) | |
| *B01F 25/80* | (2022.01) | |
| *B01F 27/272* | (2022.01) | |
| *B01F 33/83* | (2022.01) | |
| *B01F 101/00* | (2022.01) | |

(52) U.S. Cl.
CPC ............... *B01F 23/56* (2022.01); *B01F 21/10* (2022.01); *B01F 25/80* (2022.01); *B01F 27/272* (2022.01); *B01F 33/83* (2022.01); *B01F 2101/2805* (2022.01); *B01F 2215/0431* (2013.01)

(58) Field of Classification Search
CPC .......... B01F 23/56; B01F 21/10; B01F 25/80; B01F 27/272; B01F 33/83
See application file for complete search history.

(56) References Cited

U.S. PATENT DOCUMENTS

| | | | |
|---|---|---|---|
| 4,603,156 A | 7/1986 | Sortwell | |
| 4,845,192 A * | 7/1989 | Sortwell | C02F 1/54 528/499 |
| 5,328,261 A * | 7/1994 | Castano | B01F 33/8212 366/177.1 |
| 2009/0099306 A1 * | 4/2009 | Pich | C08J 3/05 422/243 |
| 2021/0140027 A1 | 5/2021 | Cho | |

FOREIGN PATENT DOCUMENTS

| | | |
|---|---|---|
| DE | 3730782 C1 | 2/1989 |
| WO | WO2011107683 A1 | 9/2011 |

\* cited by examiner

*Primary Examiner* — Anshu Bhatia
(74) *Attorney, Agent, or Firm* — Forge IP, PLLC

(57) ABSTRACT

A device for dispersing a water-soluble polymer in powder form having a standard particle size of less than 1 mm, includes: a wetting chamber, a chamber for grinding and discharging the dispersed polymer with a horizontal axis of revolution, and a mechanism for connecting the wetting chamber to the grinding chamber in the form of an L-shaped tube. The upper and lower parts of the wetting chamber and the L-shaped tube have an internal surface with an identical surface tension (TS1). The cover of the wetting chamber has an internal surface with a surface tension (TS2) higher than the surface tension (TS1) of the internal surface of the upper and lower parts of the wetting chamber and the L-shaped tube.

12 Claims, 2 Drawing Sheets

DEVICE FOR DISPERSING WATER-SOLUBLE POLYMERS

FIELD OF THE INVENTION

Figure 1:
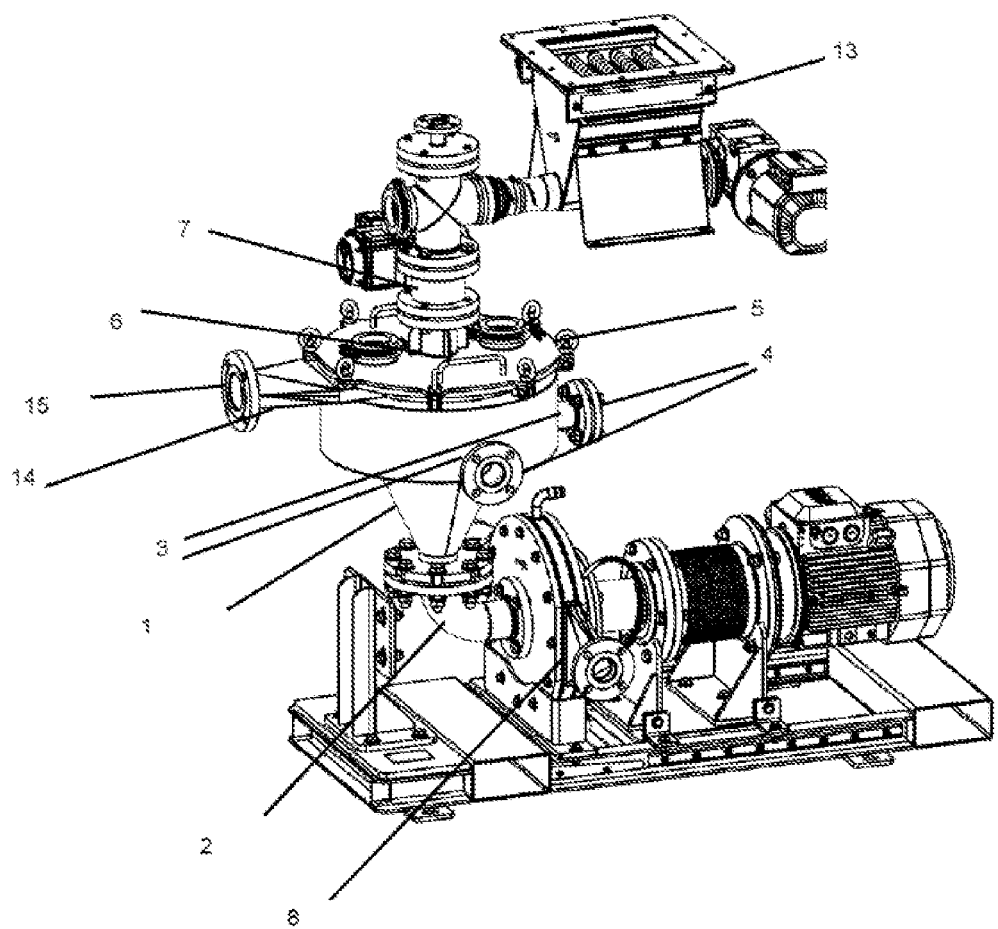

The invention relates to a device for dispersing water-soluble polymer in powder form in an aqueous solution in order to optimize its subsequent dissolution, in particular in a dissolution tank, also known as a maturation tank.

PRIOR ART

Polyacrylamides are used in increasing amounts in enhanced oil recovery (EOR) and as friction-reducing agents in hydraulic fracturing operations for shale oil and gas extraction.

Before these applications grew to a truly industrial scale, the nevertheless large-scale installations intended for the dissolution of polyacrylamides were able to process only a few tens of kilograms per hour. The problem of the initial wetting of the powder, which has a high tendency to agglomerate, was solved by simple means (ejectors, wetting shovels, nozzles in a tube, etc.). These means make it possible to obtain low flow rates at low concentrations (0.5%) and long dissolution times (1 to 2 hours for standard powders with a particle size of less than 1 mm).

Document WO 2011/107683 describes a device (PSU for Polymer Slicing Unit) that makes it possible both to grind and disperse the powder in the dissolution water, at very variable flow rates, from a few kilograms of powdered polymer per hour to more than 5 tons per hour for models developed for applications on very large oil tankers, offshore oil tankers in particular, or very intense hydraulic fracturing operations. This device comprises a rotor with cutting blades and a stator with fine slots. Depending on their thickness, these slots allow the powder to be ground more or less finely. With 200μ slots, total dissolution of the polymer in dissolution tanks downstream of the PSU is almost instantaneous, but the flow rate is low. Slots of approximately 700 microns make it possible to reduce the dissolution time by 30 minutes to 45 minutes (depending on the quality of the polymer and the characteristics of the dilution water) and to obtain very high concentrations of the order of 20 g/litre. These high concentrations make it possible to greatly reduce the size of the dissolution tanks and the metering pumps, and offer the advantage of a significant reduction in the corresponding investments.

The induced dissolution of the powdered polymer obtained by this type of system prevents the appearance of gels or skins (poorly solubilized powder) in the concentrated polymer solution. Therefore, it is not necessary to provide a filtration system, which is expensive and limiting in terms of operation and maintenance, positioned downstream of the PSU or the dissolution tank(s).

However, this PSU device presents from a number of disadvantages. When the cylindrical-conical wetting chamber and the grinding chamber are positioned one above the other, the height of the assembly can become restrictive. This is in particular the case when the device is installed in certain confined spaces, in particular in skids designed from maritime containers, which is a solution commonly used in this industrial sector. In addition, the vertical axis of the grinding chamber requires a pulley/belt system to be installed so that the motor can drive the rotor. This pulley/belt system can be prone to breakdowns and requires maintenance. Finally, the delivery pressure at the outlet of the grinding chamber remains low (less than 1 bar). One solution is therefore to provide a wetting chamber with a vertical axis of revolution connected by an elbow with an angle of curvature of 90° to a grinding chamber with a horizontal axis of revolution. This makes it possible to dispense with the pulley/belt system, significantly reduce the height of the equipment and achieve delivery pressures greater than 1 bar. Such a configuration therefore allows the maturation tank to be repositioned more freely downstream, depending on the design and installation constraints.

However, because of the highly variable quality and temperature of the dissolution waters, even with this configuration of the PSU device, the potential for fouling or even clogging of the wetting chamber and the elbow remains problematic and may lead to breakdowns or additional, and therefore costly, maintenance requirements. Indeed, certain dissolution waters may contain particles in suspension or oil residues which, as a result of the occurrence of agglomeration or evaporation (if the water is hot), lead to polymer deposits in the form of gels or agglomerates, dissolved to a greater or lesser extent, on the inner surfaces of the wetting chamber and the elbow which connects it to the grinding chamber. The same phenomenon is observed on the lower face of the cover which surmounts the wetting cone.

DESCRIPTION OF THE INVENTION

The Applicant has discovered, unexpectedly, that a device equivalent to the PSU for which the inner walls of the wetting chamber have a surface tension which is a maximum of 4 mN·m$^{-1}$ lower than that of the inner surface of the cover helps effectively attenuate the polymer deposits on the internal or inner surface of the wetting chamber and the clogging of this wetting chamber. As a result, the number of mechanical breakdowns and service interruptions for cleaning and maintenance are reduced.

Apart from preventing surface fouling, the characteristic surface tension of the inner walls of the wetting chamber gives rise to the formation of a homogeneous and continuous film of water over all of the walls. The powdered polymer is therefore permanently entrained without any deposits forming and is effectively pre-wetted before entering the grinding chamber.

More specifically, the invention relates to a device for dispersing a water-soluble polymer in powder form having a standard particle size of less than 1 mm, comprising:
- a wetting chamber, into which the polymer is dosed, comprising a cylindrical upper part with a vertical axis of revolution extended by a conical lower part, said wetting chamber being further provided with:
- at least one opening formed in the thickness of the wall of the upper and/or lower parts, said opening emerging laterally into a means for connection to a primary water supply circuit,
- a cover provided with an opening formed in the thickness of the wall of said cover, said opening emerging into a means for connection to a source of powdered polymer,
- a chamber for grinding and discharging the dispersed polymer with a horizontal axis of revolution, said grinding chamber comprising:
- a rotor driven by a motor and provided with blades, said blades possibly being inclined with respect to the horizontal plane of the stator,
- a fixed stator in the form of a cylinder, in the wall of which a single row of vertical slots is cut over part of the height of said wall, the width of the stator slots advantageously being between 150 and 700 microns, over all or part of the periphery of the chamber, a ring fed by a secondary water circuit, the ring communicating with the grinding chamber so as to spray pressurized water onto the stator, a means for connecting the wetting chamber to the grinding chamber in the form of an L-shaped tube, one end of which connects to the lower end of the wetting chamber and the other end of which connects to the inlet of the grinding chamber.

The device is characterized in that the upper and lower parts of the wetting chamber and the L-shaped tube have an internal surface with an identical surface tension (TS1), and in that the cover of the wetting chamber has an internal surface with a surface tension (TS2) higher than that of the internal surface of the upper and lower parts of the wetting chamber and the L-shaped tube (TS1).

Advantageously, the difference between the surface tension of the internal face of the cover (TS2) and that of the lower face of the upper and lower parts of the wetting chamber and the L-shaped tube (TS1) is at most 4 $mN \cdot m^{-1}$.

In another embodiment, the difference between the surface tension of the internal face of the cover (TS2) and that of the lower face of the upper and lower parts of the wetting chamber and the L-shaped tube (TS1) is 4 $mN \cdot m^{-1}$.

In order to prevent powder from accumulating in the means for connection to the primary water supply circuit and in the opening of the wall of the wetting chamber leading thereto, the thickness of the wall in which the opening is formed emerging into the means for connection to the primary water supply circuit and the internal surface of said connection means have a surface tension equal to (TS1).

In one particular embodiment, the wetting chamber, advantageously its upper part, has two openings, each emerging into a means for connection to a primary water supply circuit, the axes of the two openings preferably being separated from one another by an angle of 45°.

In order not to overload the flow rate in the L-shaped tube in the event that the flow of the polymer in the wetting chamber is slowed down, said wetting chamber has an opening formed in the thickness of the wall of its upper part, said opening emerging laterally into an overflow means.

In order to prevent powder from accumulating in the overflow means and the opening of the wall leading thereto, the thickness of the wall in which the opening is formed emerging into the overflow means and the internal surface of said overflow means have a surface tension equal to (TS1).

Similarly, in order to prevent powder from accumulating in the means for connection to the source of powdered polymer and in the opening of the wall of the cover leading thereto, the thickness of the wall of the cover in which the opening is formed emerging into the means for connection to the source of powdered polymer and the internal surface of said connection means have a surface tension equal to (TS2).

According to a particular embodiment, the surface tension (TS1) is between 7.5 and 19.5 $mN \cdot m^{-1}$ and the surface tension (TS2) is between 11.5 and 23.5 $mN \cdot m^{-1}$.

Throughout the application, the characteristic surface tensions of the invention are defined with the aid of a goniometer by measuring the contact angles of three solvents applied to the tested surface, the three solvents being water, diiodomethane and ethylene glycol at 25° C.

In practice, the means for connecting the wetting chamber to the primary water supply circuit is in the form of a tube or equivalent, the internal surface of which has a surface tension of between 7.5 and 19.5 $mN \cdot m^{-1}$.

As previously mentioned, the wetting chamber comprises a cover having an opening emerging into a means for connection to a source of powdered polymer. In practice, the connection means is also in the form of a tube or equivalent, the internal surface of which has a surface tension of between 11.5 and 23.5 $mN \cdot m^{-1}$.

Preferably, the wetting chamber is provided with an opening emerging into an overflow means in the form of a lateral pipe or equivalent, the internal surface of which has a surface tension of between 7.5 and 19.5 $mN \cdot m^{-1}$.

According to a preferred embodiment, the material constituting the internal surface of the wetting chamber and its cover, including the thickness of the wall in which the openings are formed, and the internal surface of the L-shaped tube, is metal. In practice, the internal surface undergoes a mechanical treatment capable of imparting to said surface a surface tension (TS1) or (TS2) respectively, advantageously of between 7.5 and 19.5 $mN \cdot m^{-1}$ or 11.5 and 23.5 $mN \cdot m^{-1}$ respectively. More preferably, the mechanical treatment is electropolishing.

According to another preferred embodiment, the material constituting the internal surface of the wetting chamber and its cover, including the thickness of the wall in which the openings are formed, and the internal surface of the L-shaped tube, is metal, and the internal surface is chemically modified so as to impart to said surfaces a surface tension (TS1) or (TS2) respectively. More preferably, the metal surface is chemically modified by applying a coating, the surface of said coating having a surface tension (TS1) or (TS2) respectively, preferably of between 7.5 and 19.5 $mN \cdot m^{-1}$ or 11.5 and 23.5 $mN \cdot m^{-1}$.

By way of example, the coating may be chosen from organic fluorinated thermosetting resins such as polytetrafluoroethylene, perfluoroalkoxy, fluorinated ethylene propylene, or ethylene tetrafluoroethylene.

The thickness of the coating is advantageously between 1 and 200 micrometres, and even more advantageously between 10 and 100 micrometres.

Preferably, the blades of the rotor, at least in part, and the stator are made from stainless steel chosen from austenitic-ferritic or austenitic steels treated by vacuum nitriding or by carbon diffusion.

In one advantageous embodiment, the slots of the stator are inclined at an angle of between 1° and 45° with respect to the horizontal plane of the stator. More preferably, this angle is less than 30°, and even more preferably less than 20°. This angle is preferably between 1° and 10°, and preferably between 1° and 5°.

Preferably, the slots of the stator are straight and parallel to each other.

Accordance to another feature, the slots are spaced apart from each other at regular intervals of between 1 and 5 millimetres. In one particular embodiment, the inner walls of the slots are angled in such a way as to create sharp edges on each slot.

FIGURES

FIG. 1 shows a 3D view of the device of the invention connected at its top to a metering screw for the polymer in powder form FIG. 2 shows a plan view of the device for dispersing a water-soluble polymer in powder form with a standard particle size of less than 1 mm, comprising:

a wetting chamber (1), into which the polymer is dosed, said chamber comprising:

a cylindrical upper part with a vertical axis of revolution extended by a conical lower part, laterally, arranged on the lateral wall of the cylinder constituting the upper part of the chamber, two openings (3) each emerging into a means for connection to a primary water supply circuit in the form of a pipe (4), the axes of the openings being separated from one another by an angle of 45°, an opening (14) emerging into an overflow pipe (15), a cover (5) having an opening (6) emerging into a means for connection to a source of powdered polymer in the form of a tube (7). The tube (7) is connected to the metering screw (13).

a chamber (8) for grinding and discharging the dispersed polymer with a horizontal axis of revolution, an L-shaped tube (2), one end of which connects to the lower end of the conical part of the wetting chamber, the other end connecting to the grinding chamber.

Figure 3:
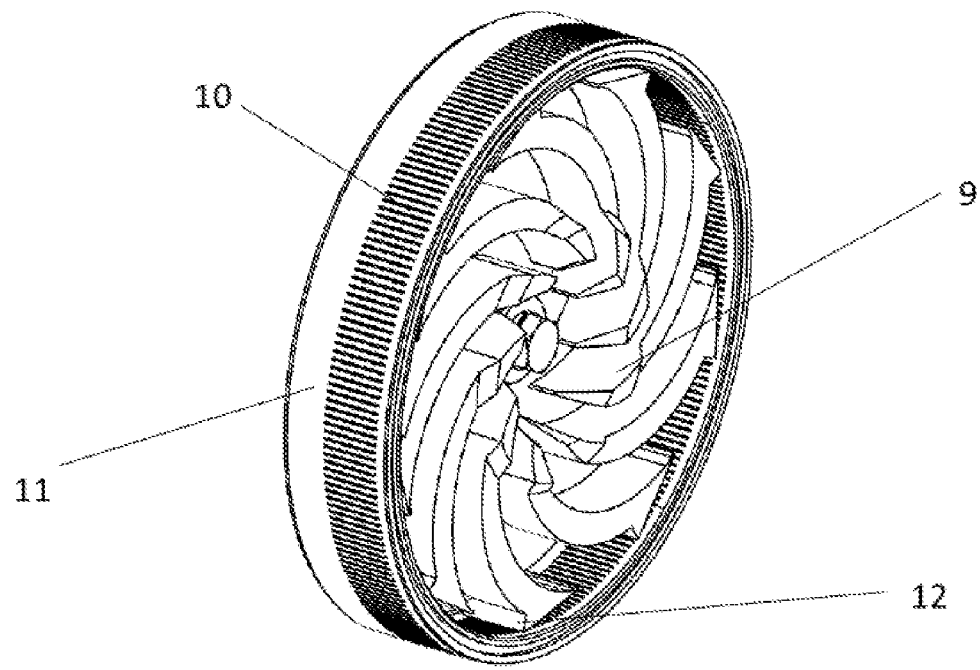

FIG. 3 shows a 3D view of the rotors and stators of the grinding chamber of the device. More precisely, the rotor/stator assembly comprises:

a rotor (9) driven by a motor and provided with nine rounded blades (12), said blades being perpendicular to the horizontal plane of the stator but possibly able to be inclined with respect to the horizontal plane of the stator, a fixed stator (11) in the form of a cylinder, in the wall of which a single row of vertical slots (10) is cut over part of the height of said wall.

The following examples illustrate the invention without limiting its scope.

EXAMPLES OF EMBODIMENTS OF THE INVENTION

Figure 2:
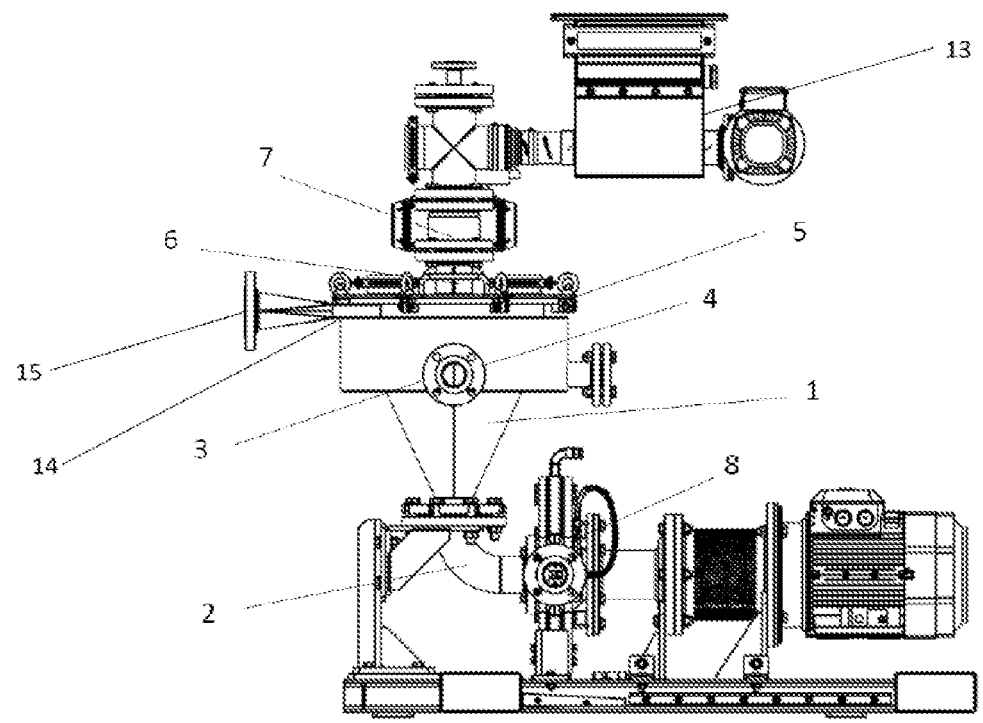

Counter-example: A device as described in FIGS. 1 to 3, in which the inner surface of the upper cylindrical and lower conical parts of the wetting chamber (1), the overflow pipe (15), the cylindrical elbow (2) and the cover (5), including the thickness of the wall of the chamber and the cover in which the openings (3, 6, 14) are formed, has a surface tension equal to 3 $N·m^{-1}$, has been put into operation. The inner surfaces (1), (2-6, 14) are metal without any chemical or mechanical treatment. Powder is observed to accumulate rapidly (within only a few days) on the inner surface of the tube of the wetting chamber and on the inner surface of the cover, causing the device to clog and stop.

Example 1: A device as described in FIGS. 1 to 3, in which the inner surface of the upper cylindrical and lower conical parts of the wetting chamber (1), the overflow pipe (15), and the cylindrical elbow (2), including the thickness of the wall of the chamber in which the openings (3, 14) are formed, has a surface tension equal to 13.5 $N·m^{-1}$, has been put into operation. The inner surface of the cover (5), including the thickness of the wall of the cover in which the opening (6) is formed, has a surface tension equal to 3 $N·m^{-1}$ (identical to the counter-example). The inner surfaces of the upper cylindrical and lower conical parts of the wetting chamber (1), the overflow pipe (15), and the cylindrical elbow (2), including the thickness of the wall of the chamber in which the openings (3, 14) are formed, are metal and have been chemically treated with Teflon® PFA (thickness 50 micrometres). Powder is observed to accumulate rapidly (within only a few days) on the inner part of the cover, eventually causing the PSU device to clog and stop. During this period, very slow or even zero accumulation of powder is observed on the inner walls of the cylindrical-conical tube.

Example 2: A device as described in FIGS. 1 to 3, in which the inner surface of the upper cylindrical and lower conical parts of the wetting chamber (1), the overflow pipe (15), and the cylindrical elbow (2), including the thickness of the wall of the chamber in which the openings (3, 14) are formed, has a surface tension equal to 13.5 $N·m^{-1}$ (as in example 1), and in which the inner surface of the cover (5) of the wetting chamber, including the thickness of the wall of the cover in which the opening (6) is formed, has a surface tension of 17.5 $N·m^{-1}$, has been put into operation. The inner surface of the cover (5) is metal and has been chemically treated with Teflon® PTFE (thickness 50 micrometres). Very slow or no accumulation of powder is observed on the inner surfaces of the upper cylindrical and lower conical parts of the wetting chamber and on the inner surface of the cover, over several weeks of operations.

The invention claimed is:

1. A device for dispersing a water-soluble polymer in powder form having a standard particle size of less than 1 mm, comprising:

a wetting chamber, into which the polymer is dosed, comprising a cylindrical upper part with a vertical axis of revolution extended by a conical lower part, said wetting chamber being further provided with:

at least one opening formed in a thickness of a wall of the upper and/or lower parts, said opening emerging laterally into a connection to a primary water supply circuit, a cover provided with an opening formed in a thickness of a wall of said cover, said opening emerging into a connection to a source of powdered polymer, a chamber for grinding and discharging the dispersed polymer with a horizontal axis of revolution, said grinding chamber comprising:

a rotor driven by a motor and provided with blades, said blades optionally being inclined with respect to the horizontal plane of the stator,
  - a fixed stator in the form of a cylinder, in the wall of which a single row of vertical slot is cut over part of a height of said wall,
  - over all or part of a periphery of the chamber, a ring fed by a secondary water circuit, the ring communicating with the grinding chamber so as to spray pressurized water onto the stator,
- an L-shaped tube connecting the wetting chamber to the grinding chamber, one end of which connects to the lower end of the wetting chamber and another end of which connects to an inlet of the grinding chamber,
- characterized in that the upper and lower parts of the wetting chamber and the L-shaped tube have an internal surface with an identical surface tension TS1, and in that the cover of the wetting chamber has an internal surface with a surface tension TS2 higher than the surface tension TS1 of the internal surface of the upper and lower parts of the wetting chamber and the L-shaped tube.

2. The device according to claim 1, characterized in that a difference between the surface tension of the internal face of the cover TS2 and that of the lower face of the upper and lower parts of the wetting chamber and the L-shaped tube TS1 is at most 4 mN/m.

3. The device according to claim 1, characterized in that a difference between the surface tension of the internal face of the cover TS2 and that of the lower face of the upper and lower parts of the wetting chamber and the L-shaped tube TS1 is 4 mN/m.

4. The device according to claim 1, characterized in that the thickness of the wall in which the opening is formed emerging into the connection to the primary water supply circuit and the internal surface of said connection to the primary water supply circuit have a surface tension equal to TS1.

5. The device according to claim 1, characterized in that the wetting chamber has an opening formed in the thickness of the wall of its upper part emerging laterally into an overflow and in that the thickness of the wall and the internal surface of said overflow have a surface tension equal to TS1.

6. The device according to claim 1, characterized in that the thickness of the wall of the cover in which the opening is formed emerging into the connection to the source of powdered polymer and the internal surface of said connection to the source of powdered polymer have a surface tension equal to TS2.

7. The device according to claim 1, characterized in that a material constituting the internal surface of the wetting chamber, its cover, including the thickness of the wall in which the openings are formed, and the internal surface of the L-shaped tube, is metal which has undergone a mechanical treatment capable of imparting to said surface a surface tension TS1 or TS2 respectively.

8. The device according to claim 1, characterized in that the material constituting the internal surface of the wetting chamber, its cover, including the thickness of the wall in which the openings are formed, and the internal surface of the L-shaped tube, is metal, and the internal surface is chemically modified so as to impart to said surfaces a surface tension TS1 or TS2 respectively.

9. The device according to claim 1, characterized in that the surface tension TS1 is between 7.5 and 19.5 mN·m$^{-1}$ and the surface tension TS2 is between 11.5 and 23.5 mN/m.

10. The device according to claim 7, characterized in that the mechanical treatment is electropolishing.

11. The device according to claim 8, characterized in that the metal surface is chemically modified by a coating, the surface of said coating having a surface tension TS1 or TS2.

12. The device according to claim 1, characterized in that the blades of the rotor, at least in part, and the stator are made of stainless steel chosen from austenitic-ferritic or austenitic steels treated by vacuum nitriding or by carbon diffusion.

* * * * *